US006748685B2

(12) United States Patent
Peel

(10) Patent No.: US 6,748,685 B2
(45) Date of Patent: Jun. 15, 2004

(54) DISPLAY SIGN

(75) Inventor: Ronald Brian Peel, North Muskegon, MI (US)

(73) Assignee: United Sign Company, Muskegon, MI (US)

( * ) Notice: Subject to any disclaimer, the term of this patent is extended or adjusted under 35 U.S.C. 154(b) by 0 days.

(21) Appl. No.: 10/274,650

(22) Filed: Oct. 21, 2002

(65) Prior Publication Data

US 2003/0089009 A1 May 15, 2003

Related U.S. Application Data

(60) Provisional application No. 60/345,983, filed on Oct. 19, 2001.

(51) Int. Cl.[7] ................................................ G09F 11/18
(52) U.S. Cl. ........................................... 40/471; 40/518
(58) Field of Search ......................... 40/466, 467, 471, 40/518, 520

(56) References Cited

U.S. PATENT DOCUMENTS

| | | | | | |
|---|---|---|---|---|---|
| 3,614,727 | A | | 10/1971 | Fritts | 340/22 |
| 4,680,883 | A | | 7/1987 | Stadjuhar et al. | 40/471 |
| 4,741,118 | A | * | 5/1988 | Aiken et al. | 40/518 |
| 4,995,183 | A | * | 2/1991 | Aiken, Sr. | 40/518 |
| 5,003,717 | A | | 4/1991 | Trame et al. | 40/518 |
| 5,061,921 | A | | 10/1991 | Lesko et al. | 340/815.24 |
| 5,088,219 | A | | 2/1992 | Toraby-Payhan | 40/471 |
| 5,138,781 | A | | 8/1992 | Claver | 40/524 |
| 5,412,893 | A | | 5/1995 | Aiken, Sr. | 40/518 |
| 5,493,802 | A | | 2/1996 | Simson | 40/471 |
| 5,517,778 | A | | 5/1996 | Simson | 40/471 |
| 5,597,994 | A | | 1/1997 | Hornung | 235/375 |
| 5,638,625 | A | * | 6/1997 | Ilkka et al. | 40/471 |
| 5,940,999 | A | | 8/1999 | Harruff et al. | 40/471 |
| 5,979,093 | A | | 11/1999 | Harruff et al. | 40/471 |
| 6,023,868 | A | | 2/2000 | Viode et al. | 40/515 |

* cited by examiner

*Primary Examiner*—S. Joseph Morano
*Assistant Examiner*—Lars A. Olson
(74) *Attorney, Agent, or Firm*—Warner Norcross & Judd LLP

(57) ABSTRACT

A scroll-type display sign is provided, including a frame, a first fixed shaft connected on the frame, a second fixed shaft connected on the frame parallel spaced from the first shaft, a first scroll roller rotatably mounted on the first shaft, a second scroll roller rotatably mounted on the second shaft, a signage web connected on the first and second scroll rollers, a drive sprocket affixed with the first scroll roller and mounted on the first shaft, a spring sprocket affixed with the second scroll roller and mounted on the second shaft, a constant force spring connected with the spring sprocket to tension the signage web, and a motor torsionally connected with said drive sprocket.

17 Claims, 5 Drawing Sheets

DISPLAY SIGN

This application claims the benefit of U.S. Provisional Serial No. 60/345,983 filed Oct. 19, 2001.

FIELD OF THE INVENTION

The present invention relates to scroll-type signs, particularly scroll-type signs which are often used in outdoor advertising.

BACKGROUND OF THE INVENTION

Scroll-type signs typically have two rollers that are rotatably mounted between spaced apart sides of a frame. The rollers rotate bi-directionally about a parallel axis to wind an information bearing signage web on one roll and to unwind the web from the other roll. Typically, scroll-type signs also have an internal source of illumination. Most scroll-type signs have one roller which is powered by an electric motor. Typically, when there are multiple signage webs, especially when advertising a price of vehicle fuel or goods at convenience stores, each price numeral will have its own signage web wound on a pair of rollers supported on a separate frame. Therefore when there are multiple numbers, multiple frames are involved.

The utilization of multiple frames in a scroll sign generates several problems. One problem is that the frames cause a breakup in the visual display of the signage and the viewer can lose a sense of visual unity in the sign. A second problem is that the multiple frames cause the display sign to be heavier. Therefore, a more rigid stand must be utilized since many scroll-type signs are placed in elevated positions. Third, utilization of multiple frames also adds to maintenance complexity and cost. The cost associated with many scroll signs is one of the major factors which discourage the utilization of scroll signs for many small retail outlets.

It is desirable to provide a scroll-type display sign, especially when there are multiple signage webs, that does not require separate frame members for each scroll roller pair associated with a given numeral or letter.

It is also desirable to provide a scroll-type display sign that is lighter than that previously available, which can be maintained and modified by operators with low technical capabilities, and can be less expensive than other scroll-type display signs currently available.

SUMMARY OF THE INVENTION

To make manifest the above-noted and other desires, a revelation of the present invention is brought forth. In a preferred embodiment the present invention provides a single multiple signage web scroll-type display sign that includes a frame with two spaced-apart ends. Connected to the frame spaced-apart ends at their extreme ends are parallel spaced, fixed first and second shafts. Each signage module has a first scroll roller rotatably mounted on the first shaft and a second scroll roller rotatably mounted on the second shaft. A signage web is connected between the first and second rollers.

A drive sprocket is torsionally affixed with the first scroll roller and rotatably mounted on the first shaft. A spring sprocket is torsionally affixed with the second scroll roller and is rotatably mounted on the second shaft. A constant force coil spring is connected to the spring sprocket by a first flexible force transmission member to tension the signage scroll. A motor driven pulley is torsionally connected with the drive sprocket by a toothed belt to turn the signage web on the first and second rollers. The motor is supported by a gear box which additionally supports the pulley and the constant force spring. Multiple signage modules can be utilized on the same common fixed shafts without the utilization of separate frames that add additional weight or width to the scroll-type display sign.

It will be apparent to those skilled in the art of other advantages of the invention as it is further revealed in the accompanying drawings and detailed description.

DETAILED DESCRIPTION OF THE DRAWINGS

Figure 1:
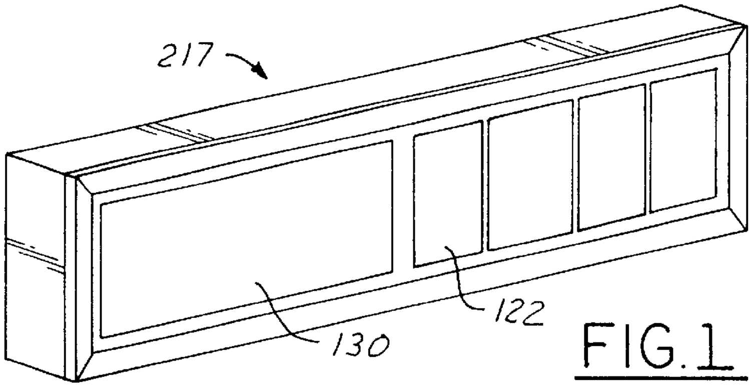
FIG. 1 is a front perspective view of a preferred embodiment scroll-type sign according to the present invention.

Referring to FIGS. 3–20 and 21–25, the scroll-type display sign 7 according to the present invention is provided. The sign 7 has a frame 10. The frame 10 is typically fabricated from a stamped sheet metal material and has a top member 12. The top member 12 is fitted over two spaced-apart frame end members 14. The frame end members 14 have a top end 16 and a lower end 18. Punched into the frame ends 14 are an upper aperture 20 and a lower aperture 22. Mounted into the aperture 20 is a saddle 24, which typically will be made from a polymeric material. The saddle 24 has an insertion or outboard end 26. The outboard end 26 has a cylindrical surface 28. The cylindrical surface 28 is typically sized to have a slight interference fit with the upper aperture 20. A flange 30 limits the extent of exertion of the saddle cylindrical surface 28 through the aperture 20. The saddle has an inboard end 32. The saddle inboard end 32 has a cylindrical side wall 34. The cylindrical side wall 34 has a radial slot 36.

Connected with the two ends 14 of the frame and supported thereby by its extreme ends 38 is a second or upper shaft 40. Parallel spaced from the fixed shaft 40 is a first or lower shaft 42. The lower shaft 42 has its extreme ends connected with the frame end 14 by saddle 24 which is inserted within the lower apertures 22 of the frame ends. Although the shafts 40, 42 in most cases are identical, there is no requirement that they need be in all applications of the present invention. In other embodiments not shown, the shafts can be provided by noncircular cross-sectional elongated members.

Rotatably mounted on the shaft 42 is a first scroll roller 46. The first scroll roller 46 is a tubular member which can be metal or plastic. A first extreme end 48 of the scroll is fitted over a scroll retainer 50. Scroll retainer 50 has a cylindrical portion 52. The cylindrical portion 52 has an inner diameter 54. The inner diameter 54 is sized so that the scroll retainer may freely rotate upon an outer diameter 56 of the shaft 42. The cylindrical portion 52 has an outer diameter 58 which allows it to have a press fit with an inner diameter 60 of the first scroll roller 46.

An opposite extreme end 62 of the scroll roller is rotatably mounted on the shaft 42 by a drive sprocket 66. The drive sprocket 66 has a cylindrical portion 68. The cylindrical portion 68 has an outer diameter 70. The outer diameter 70 has a press fit relationship with the inner diameter 60 of the scroll roller thereby torsionally affirming the scroll roller 46 with the drive sprocket 66. The outer diameter 70 of the drive sprocket allows it to have a rotative connection on the shaft 42. The drive sprocket 66 also has a sprocket portion 72.

The drive sprocket 66 is typically fabricated from a polymeric material. The drive sprocket 66 is driven by a flexible tension force transmission member provided by a belt 76. The belt 76 has teeth 78 to increase its efficiency of engagement with the sprocket portion 72 of the drive sprocket. The belt 76 also engages a motor pulley 80. The pulley is torsionally driven by a motor 84.

The motor 84 has a shaft 86 that has a gear (not shown) whose output is engaged with gears (not shown) of a gear box 88. The gear box 88 has an output shaft 90. The output shaft 90 is torsionally affixed with the motor sprocket 80. Accordingly, the motor 84 is torsionally connected with the drive sprocket 66 via a flexible tension force transmission member which is provided by the belt 76.

The gear box 88 has a flanged portion 92 which has apertures (not shown) appropriately placed therein for the fastener connection of the gear box 88 and motor 84 along predrilled apertures (not shown) of a base plate 96 of the sign frame. Portion 92 of the gear box supports the motor 84. Additionally, portion 92 of the gear box has an extension 98. The extension 98 has an aperture 100. The aperture 100 supports a pin (not shown) that rotatably supports a constant force coil spring 104.

The spring 104 has an extreme end connected with a flexible tension force transmission member provided by a cable 106. The cable 106 is fixably connected along its end 108 with a spring sprocket 110. The sprocket 110 can be identical to the drive sprocket 66 or can be similar to the drive sprocket 66 with a smooth drum rather than having a sprocketed drum portion, such as portion 72. The spring socket 110 has a cylindrical portion similar or identical to that of cylindrical portion 68, which has a press fit engagement with a top or second scroll roller 116. The end of the second scroll roller opposite the spring 110 will be supported on a scroll retainer 50 to rotatably mount the second scroll roller 116 on the shaft 40.

Figure 9:
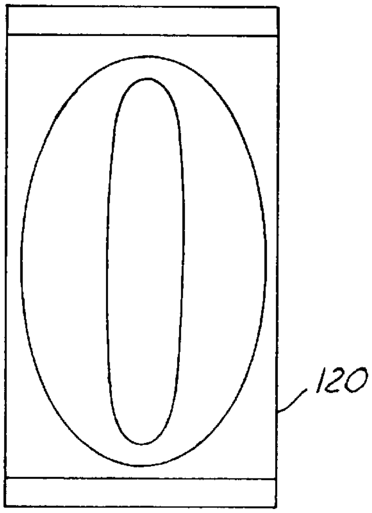
FIG. 9 is a front elevational view of a signage web of the scroll-type sign shown in FIG. 3.
Figure 10:
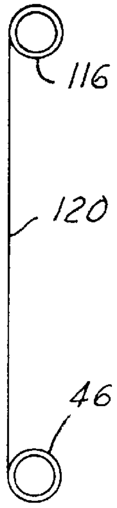
FIG. 10 is a side elevational view of a scroll-type signage web shown in FIG. 9.
Figure 11:
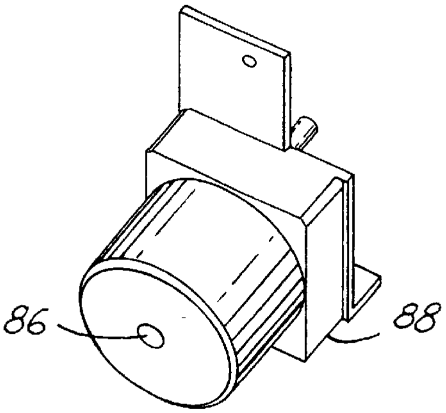
FIG. 11 is a perspective view of a motor, gear box, and spring support in the scroll-type sign shown in FIG. 3.
Figure 12:
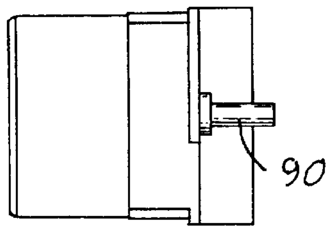
FIG. 12 is a top elevational view of the motor, gear box, and spring shown in FIG. 11.
Figure 13:
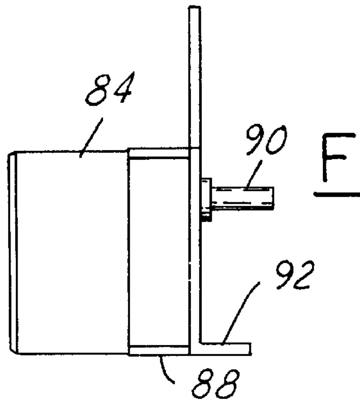
FIG. 13 is a rear elevational view of the motor, gear box, and spring shown in FIG. 11.
Figure 14:
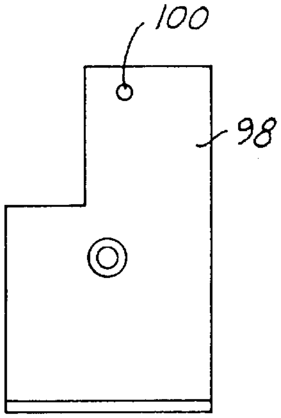
FIG. 14 is a side elevational view of the motor, gear box, and spring shown in FIG. 11.
Figure 16:
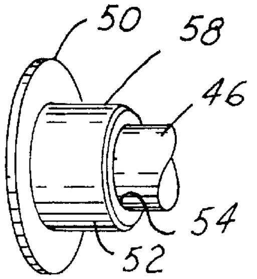
FIG. 16 is a perspective view of a scroll roller retainer utilized in the scroll-type sign of FIG. 3.
Figure 15:
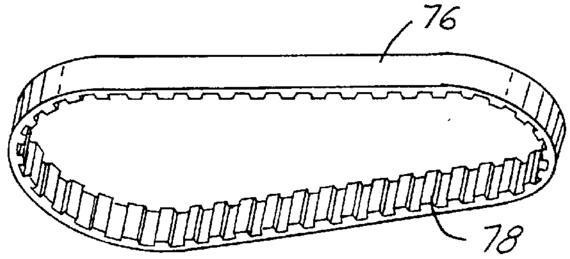
FIG. 15 is a perspective view of a tooth belt utilized to drive the signage web in the scroll-type sign shown in FIG. 3.
Figure 17:
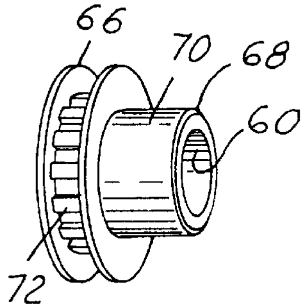
FIG. 17 is a drive sprocket for the scroll-type sign of FIG. 3.
Figure 18:
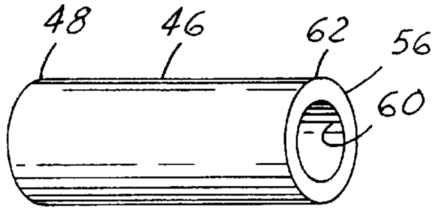
FIG. 18 is a mid portion of a scroll roller for the sign shown in FIG. 3.
Figure 19:
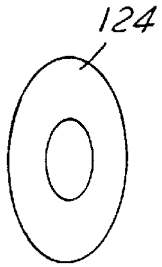
FIG. 19 is a thrust washer utilized in the scroll-type sign of FIG. 3.
Figure 20:
FIG. 20 is a reduced sized perspective view of a shaft utilized in the scroll sign of FIG. 3.
Figure 21:
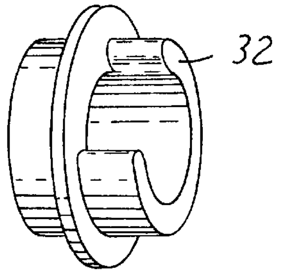
FIGS. 21, 22, 23 and 24 are perspective, top plane, side elevational and front elevational views of a saddle which is utilized to hold the shafts and the scroll-type sign shown in FIG. 3.
Figure 22:
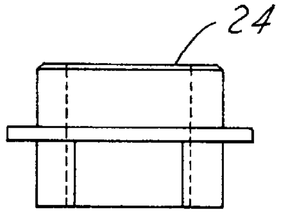
Figure 25:
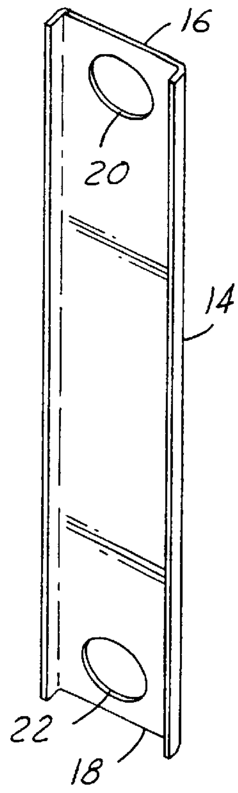
FIG. 25 is a side perspective view of a frame end of the sign of FIG. 3.
Figure 23:
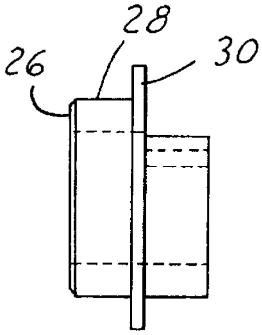
Figure 24:
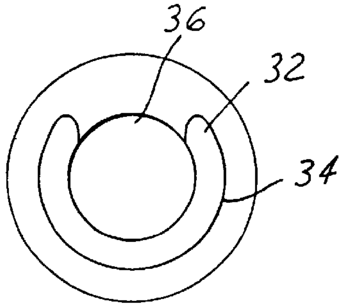

Referring to FIG. 9, connected to first scroll roller 46 and second scroll roller 116 is a signage scroll or web 120. The web is typically made from a fabric material. The web is translated to illustrate another numeral or letter by activation of the motor 84. The web 120 is kept taut or in tension by the spring 104. The spring 104 also causes the web to be retracted after being pulled out by the motor.

Figure 3:
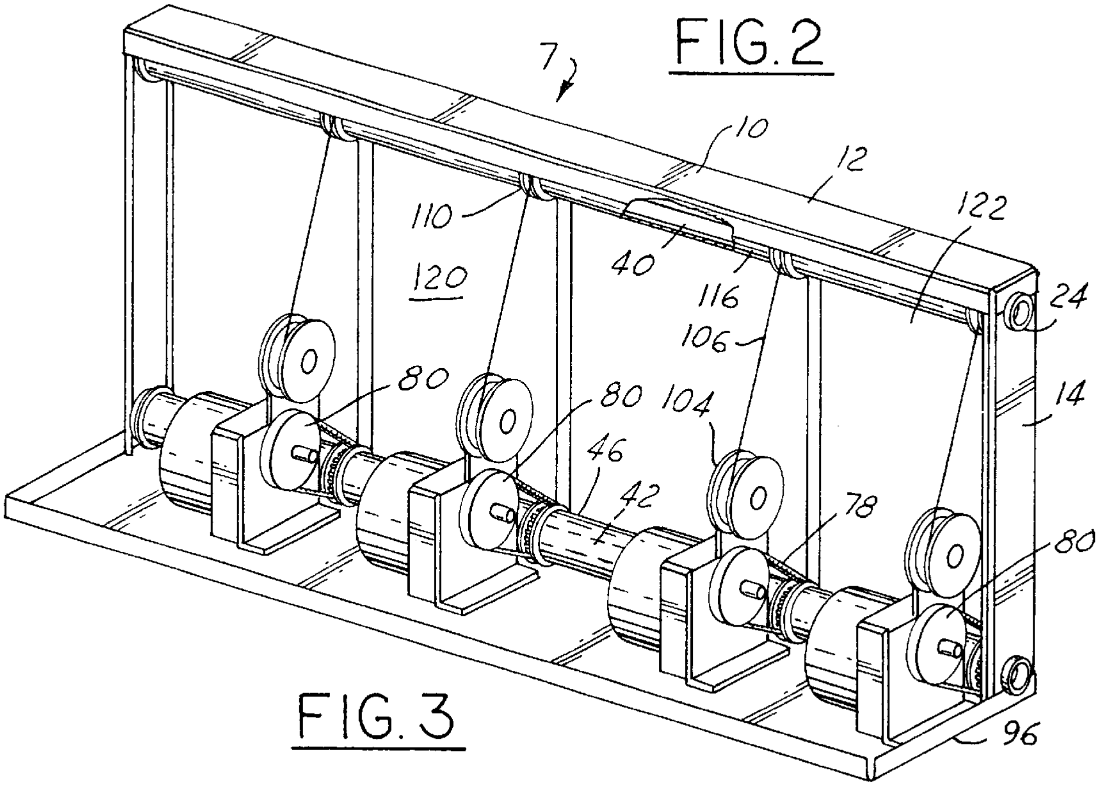
FIG. 3 is a rear elevational view of an alternate preferred embodiment scroll-type sign according to the present invention.
Figure 4:
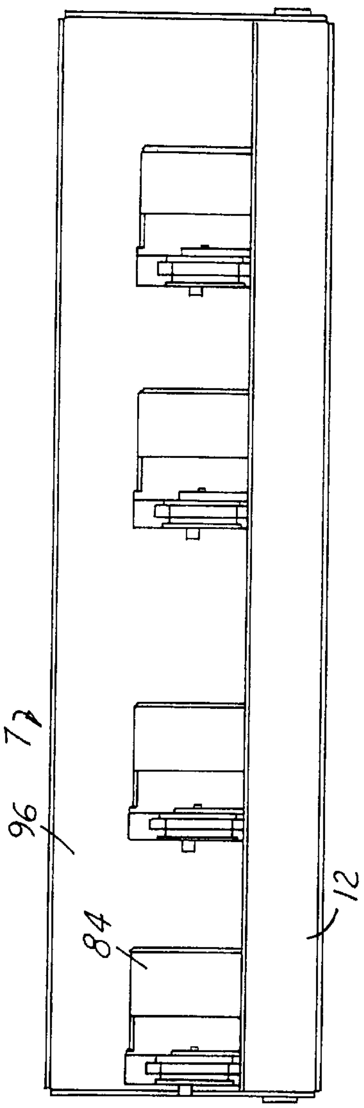
FIG. 4 is a top plane view of the scroll-type sign shown in FIG. 3.
Figure 5:
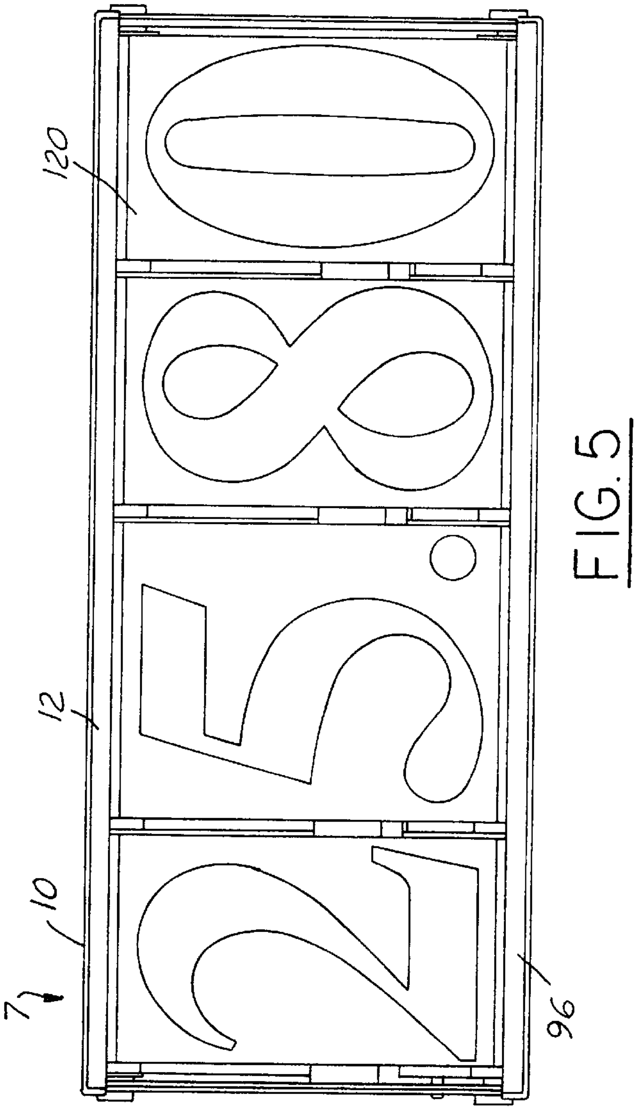
FIG. 5 is a front elevational view of the scroll-type sign shown in FIGS. 3 and 4.
Figure 6:
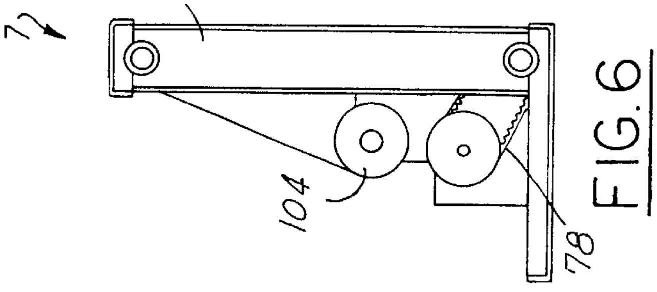
FIG. 6 is a side elevational view of the scroll-type sign shown in FIGS. 3 and 4.
Figure 7:
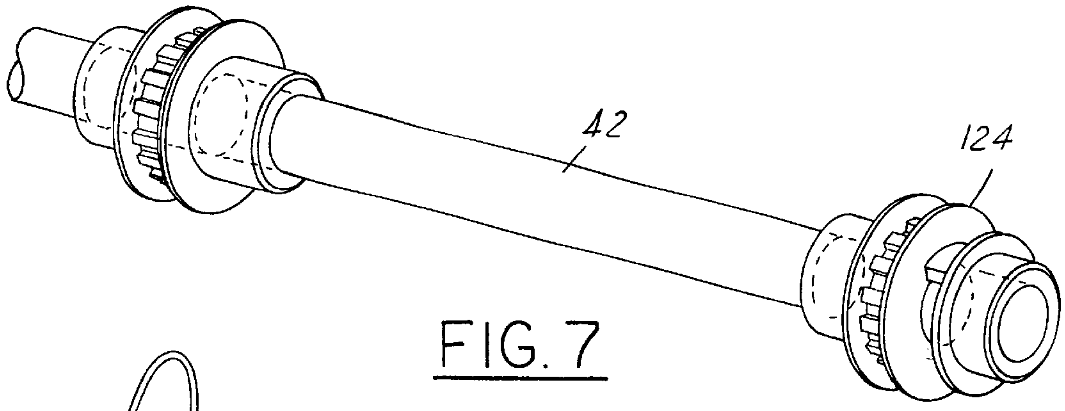
FIG. 7 is a partial perspective view of various rotative components of the scroll-type sign shown in FIG. 3.
Figure 8:
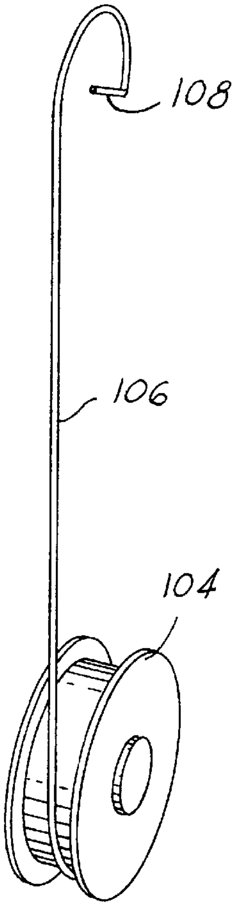
FIG. 8 is a perspective view of a constant force spring utilized in the scroll-type sign shown in FIG. 3.

As shown on FIG. 3, the sign 7 has four signage modules 122. The signage modules 122 need only be separated on the shafts 40, 42 by a thin thrust washer 124. An advantage of the present invention is that each signage module 122 does not have to have its own separate frame.

To change a signage web 120 for maintenance or other purposes, the shafts 40, 42 can be popped out of their saddles 24. The threaded fasteners (not shown) attaching the gear box flanged portion 92 to the base plate 96 can be loosened and the gear box need only be moved slightly forward to allow for the removal of the belt 76. The cable 106 can be disconnected from the spring sprocket and appropriate replacement or maintenance can be performed by sliding the scroll rollers from the shafts. Operators having only moderate technical capabilities can perform such maintenance.

Figure 2:
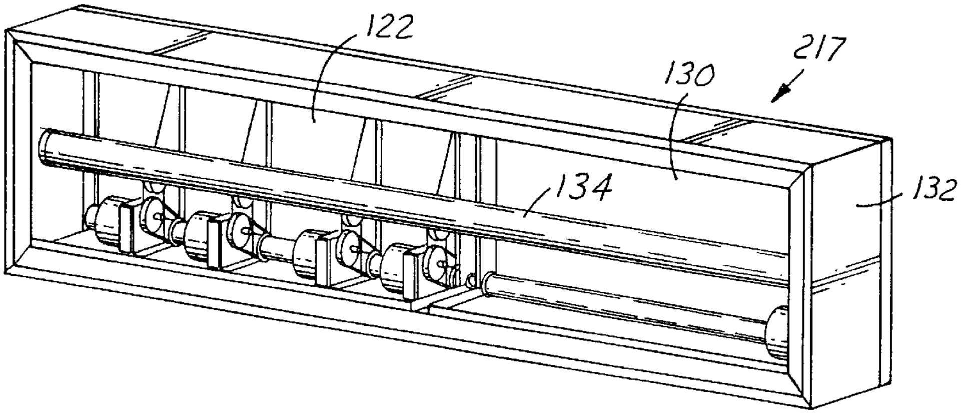
FIG. 2 is a rear perspective view of the scroll-type sign shown in FIG. 1.

Referring to FIGS. 1 and 2, a scroll-type display sign 217 is provided. The sign 217 has many items common or similar in configuration to those previously described in relation to sign 7. On one end of the sign 217 are several signage modules 122. On the opposite end of the sign 217 is an enlarged signage web picture module 130. To illustrate the signage modules 122, 130, an illuminative bulb 134 extends between two frame ends 132.

Figure 26:
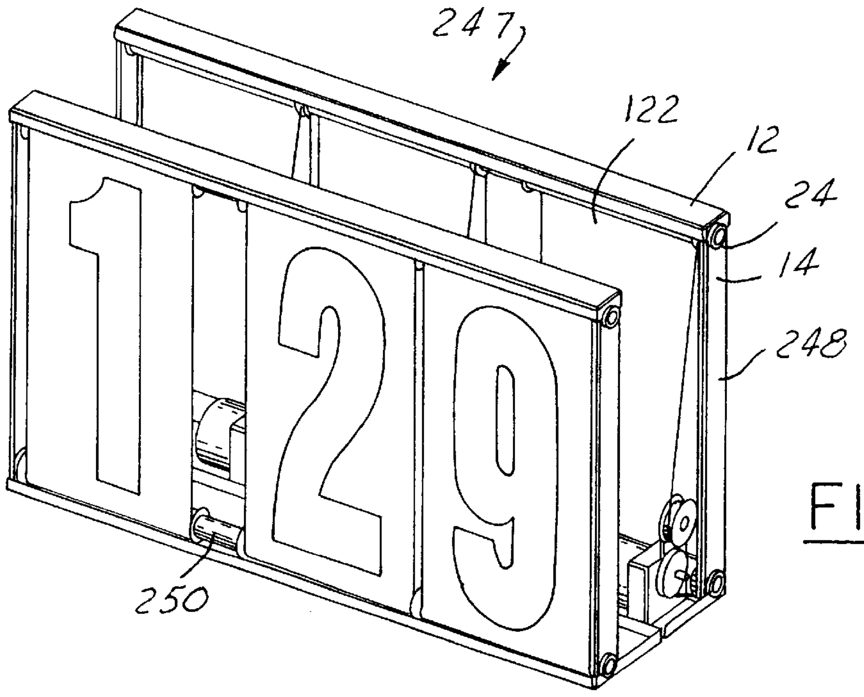
FIG. 26 is a perspective view of a scroll-type sign according to the present invention which additionally uses a spacer to laterally separate signage modules of the scroll-type sign.

Referring to FIG. 26, a three-module, dual-sided, scroll-type display sign 247 is provided with like items being given identical reference numerals to those given in relationship to sign 7. Sign 247 has three signage modules 122. Sign 247 is also a two-sided sign provided by two frames 248. To give a space between the numerals 1 and 2, there is provided a spacer 250 which separates two adjoining signage modules 122.

While various embodiments of the invention have been brought forth, it will be apparent to those skilled in the art of the changes and modifications which can be made to the present invention without departing from the scope of the invention as it is encompassed by the following claims.

I claim:

1. A scroll-type display sign comprising:

a frame;

a first fixed shaft connected on said frame;

a second fixed shaft connected on said frame parallel spaced from said first shaft;

a first scroll roller rotatably mounted on said first shaft;

a second scroll roller rotatably mounted on said second shaft;

a signage web connected on said first and second scroll rollers;

a drive sprocket torsionally affixed with said first scroll roller and rotatably mounted on said first shaft;

a spring sprocket torsionally affixed with said second scroll roller and rotatably mounted on said second shaft;

a constant force spring connected with said spring sprocket by a first flexible force transmission member to tension said signage web; and a motor torsionally connected with said drive sprocket by a second flexible force transmission member to turn said signage web.

2. A scroll-type display sign as described in claim 1, wherein said second force transmission member is a belt and wherein said motor is torsionally connected with a pulley connected with said belt.

3. A scroll-type display sign as described in claim 2, wherein said belt is a toothed belt.

4. A scroll-type display sign as described in claim 2, wherein said motor is torsionally connected with a gear box which is torsionally connected with said pulley.

5. A scroll-type display sign as described in claim 4, wherein said gear box supports said motor.

6. A scroll-type display sign as described in claim 4, wherein said gear box is connected with a support which mounts said spring.

7. A scroll-type display sign as described in claim 1, having a plurality of signage webs and each said signage web having a separate first scroll roller and drive sprocket supported on said first shaft and a second scroll roller and spring sprocket supported on said second shaft and a separate motor for turning said signage web on said first and second rollers and a constant force spring for tensioning said signage web on said scroll rollers.

8. A scroll-type display sign as described in claim 7, having a spacer on at least one of said first and second shafts between at least two different signage webs.

9. A scroll-type display sign as described in claim 1, wherein said frame includes first and second ends supporting said first and second shafts along said first and second shafts extreme ends.

10. A scroll-type display sign as described in claim 1, wherein said frame supports an extreme end of one of said shafts and said shaft is held within a saddle which is mounted to said frame.

11. A scroll-type display sign as described in claim 10, wherein said saddle is mounted within an aperture of said frame.

12. A scroll-type display sign as described in claim 10, wherein said shaft can pop in to said saddle.

13. A scroll-type display sign as described in claim 10, wherein said saddle is fabricated from a polymeric material.

14. A scroll-type display sign as described in claim 9, further including a light bulb supported at its extreme ends by said frame members.

15. A scroll-type display sign as described in claim 1, wherein at least one of said scroll rollers has an end supported on said frame by a retainer.

16. A scroll-type display sign comprising:

a frame having at least first and second spaced apart ends;

a first fixed shaft with extreme ends fixably connected with said frame ends;

a second fixed shaft with extreme ends fixably connected with said frame ends parallel spaced from said first fixed shaft;

a first scroll roller rotatably mounted on said first shaft;

a second scroll roller rotatably mounted on said second shaft;

a signage web connected on said first and second scroll rollers;

a drive sprocket torsionally affixed with said first scroll roller and rotatably mounted on said first shaft;

a spring sprocket torsionally affixed with said second scroll roller and rotatably mounted on said second shaft;

a constant force spring connected to said spring sprocket by a first flexible force transmission member to tension said signage web; and a motor torsionally connected with a pulley via a gear box, said pulley engaging a toothed belt to turn said drive sprocket to move said signage web and wherein said gear box mounts said pulley and said spring.

17. A scroll-type display sign comprising:

a frame including two spaced-apart ends;

a first fixed shaft connected along extreme ends with said frame ends by pop-in saddles mounted in said frame ends;

a second fixed shaft with extreme ends connected with said frame ends by pop-in saddles mounted in said frame ends parallel spaced from said first fixed shaft; and at least first and second signage modules, each said signage module including:

- a first scroll roller rotatably mounted on said first shaft;
- a second scroll roller rotatably mounted on said second shaft;
- a signage web connected on said first and second scroll rollers;
- a drive sprocket torsionally affixed with said first scroll roller and rotatably mounted on said first shaft;
- a spring sprocket torsionally affixed with said second scroll roller and rotatably mounted on said second shaft;
- a constant force coil spring being connected to said spring sprocket by a first flexible force transmission member to tension said signage web; and
- a motor connected with said drive sprocket by a second flexible force transmission member for turning said drive sprocket to move said signage web.

* * * * *